United States Patent [19]
Wilcox

[11] Patent Number: 6,127,815
[45] Date of Patent: Oct. 3, 2000

[54] CIRCUIT AND METHOD FOR REDUCING QUIESCENT CURRENT IN A SWITCHING REGULATOR

[75] Inventor: Milton E. Wilcox, Saratoga, Calif.

[73] Assignee: Linear Technology Corp., Milpitas, Calif.

[21] Appl. No.: 09/260,990

[22] Filed: Mar. 1, 1999

[51] Int. Cl.[7] ........................................... G05F 1/40
[52] U.S. Cl. .............................. 323/282; 323/351
[58] Field of Search ................................. 323/265, 269, 323/273, 282, 284, 285, 351, 280

[56] References Cited

U.S. PATENT DOCUMENTS

| | | |
|---|---|---|
| 3,458,798 | 7/1969 | Fang et al. . |
| 3,571,697 | 3/1971 | Phillips . |
| 3,579,091 | 5/1971 | Clarke et al. . |
| 3,581,186 | 5/1971 | Weinberger . |
| 3,582,758 | 6/1971 | Gunn . |
| 3,585,491 | 6/1971 | Petersen . |
| 3,733,540 | 5/1973 | Hawkins . |
| 3,772,588 | 11/1973 | Kelly et al. . |
| 3,784,893 | 1/1974 | Rando . |
| 3,863,128 | 1/1975 | Wilwerding . |
| 3,879,647 | 4/1975 | Hamilton et al. . |
| 3,992,638 | 11/1976 | Sauvanet . |
| 4,013,939 | 3/1977 | Biess et al. . |
| 4,035,710 | 7/1977 | Joyce . |
| 4,071,884 | 1/1978 | Maigret . |
| 4,160,288 | 7/1979 | Stuart et al. . |
| 4,319,179 | 3/1982 | Jett, Jr. ..................... 323/281 |
| 4,326,245 | 4/1982 | Saleh . |
| 4,395,675 | 7/1983 | Toumani . |
| 4,428,015 | 1/1984 | Nesler . |
| 4,462,069 | 7/1984 | Becky . |
| 4,479,174 | 10/1984 | Cates . |
| 4,493,017 | 1/1985 | Kammiller et al. . |
| 4,519,024 | 5/1985 | Federico et al. . |
| 4,541,041 | 9/1985 | Park et al. . |
| 4,554,499 | 11/1985 | Sherman et al. . |

(List continued on next page.)

FOREIGN PATENT DOCUMENTS

| | | |
|---|---|---|
| 0 428 377 A2 | 5/1991 | European Pat. Off. . |
| 60-32565 | 2/1985 | Japan . |
| 60-156269 | 8/1985 | Japan . |
| 63-307510 | 12/1988 | Japan . |
| 3-113986 | 11/1991 | Japan . |
| 4-42771 | 2/1992 | Japan . |
| 4-49844 | 2/1992 | Japan . |
| 4-101286 | 9/1992 | Japan . |
| 4-128086 | 11/1992 | Japan . |

OTHER PUBLICATIONS

Analog Devices, Inc., "High Efficiency Synchronous Step–Down Switching Regulators ADP1148, ADP1148–3.3, ADP1148–5," Analog Devices, pp. 1–14, 1997, No Month.

Archer, William R., "Current Drives Synchronous Rectifier," EDN, Nov. 28, 1985, pp. 279–281.

Archer, William R., "Current–Driven Synchronous Rectifier," Motorola TMOS Power FET Design Ideas, BR316, pp. 9–10, 1985.

Blanchard, Richard, et al., "MOSFETs, Schottky Diodes Vie for Low–Voltage–Supply Designs," EDN, p. 197, Jun. 28, 1984.

Borghi et al., "Discontinuous Conduction Mode Power Switching Regulator IC," PCI Oct. 1988 Proceedings, pp. 31–41, Oct. 1988.

Brown, Marty, "Practical Switching Power Supply Design," pp. 20–34, Academic Press, Inc., 1990, No Month.

(List continued on next page.)

*Primary Examiner*—Adolf Denske Berhane
*Attorney, Agent, or Firm*—Fish & Neave; Michael E. Shanahan

[57] ABSTRACT

A switching mode voltage regulator circuit that operates at reduced quiescent current levels is provided. The voltage regulator preferably includes a control circuit and a switching element that connects and disconnects filter circuitry from the control circuit. An error amplifier in the control circuit is placed in a micropower operating state when the regulator is in standby mode to reduce quiescent current.

35 Claims, 3 Drawing Sheets

U.S. PATENT DOCUMENTS

| | | |
|---|---|---|
| 4,578,630 | 3/1986 | Grosch . |
| 4,610,521 | 9/1986 | Inoue . |
| 4,634,956 | 1/1987 | Davis et al. . |
| 4,672,303 | 6/1987 | Newton . |
| 4,672,518 | 6/1987 | Murdock . |
| 4,674,020 | 6/1987 | Hill . |
| 4,683,529 | 7/1987 | Bucher, II . |
| 4,706,177 | 11/1987 | Josephson . |
| 4,709,315 | 11/1987 | Ramos . |
| 4,712,169 | 12/1987 | Albach . |
| 4,716,514 | 12/1987 | Patel . |
| 4,727,308 | 2/1988 | Huljak et al. . |
| 4,754,385 | 6/1988 | McDade et al. . |
| 4,801,859 | 1/1989 | Dishner . |
| 4,813,066 | 3/1989 | Holtz et al. . |
| 4,814,684 | 3/1989 | McCurdy . |
| 4,819,122 | 4/1989 | Gontowski, Jr. . |
| 4,823,070 | 4/1989 | Nelson . |
| 4,843,532 | 6/1989 | Freedman . |
| 4,866,587 | 9/1989 | Wadlington . |
| 4,870,555 | 9/1989 | White . |
| 4,884,183 | 11/1989 | Sable . |
| 4,902,957 | 2/1990 | Cassani et al. . |
| 4,906,913 | 3/1990 | Stanojevic ............................. 323/303 |
| 4,922,404 | 5/1990 | Ludwig et al. . |
| 4,928,200 | 5/1990 | Redl et al. . |
| 4,929,882 | 5/1990 | Szepesi . |
| 4,931,716 | 6/1990 | Jovanovic et al. . |
| 4,996,638 | 2/1991 | Orr . |
| 5,028,861 | 7/1991 | Pace et al. . |
| 5,034,871 | 7/1991 | Okamoto et al. . |
| 5,066,900 | 11/1991 | Bassett . |
| 5,068,575 | 11/1991 | Dunsmore et al. . |
| 5,081,411 | 1/1992 | Walker . |
| 5,097,196 | 3/1992 | Schoneman . |
| 5,128,603 | 7/1992 | Wölfel . |
| 5,134,355 | 7/1992 | Hastings et al. . |
| 5,138,249 | 8/1992 | Capel . |
| 5,144,547 | 9/1992 | Masamoto . |
| 5,170,333 | 12/1992 | Niwayama . |
| 5,177,676 | 1/1993 | Inam et al. . |
| 5,179,511 | 1/1993 | Troyk et al. . |
| 5,184,129 | 2/1993 | Fung et al. . |
| 5,193,211 | 3/1993 | Nobusawa . |
| 5,237,606 | 8/1993 | Ziermann . |
| 5,309,078 | 5/1994 | Cameron . |
| 5,396,413 | 3/1995 | Barlage . |
| 5,408,162 | 4/1995 | Williams . |
| 5,481,178 | 1/1996 | Wilcox et al. . |
| 5,548,189 | 8/1996 | Williams . |
| 5,568,044 | 10/1996 | Bittner . |
| 5,625,278 | 4/1997 | Thiel et al. ............................. 323/280 |
| 5,627,460 | 5/1997 | Bazinet et al. . |
| 5,717,319 | 2/1998 | Jokinen .................................. 323/280 |
| 5,731,694 | 3/1998 | Wilcox et al. .......................... 323/287 |
| 5,774,813 | 6/1998 | Jokinen .................................. 455/574 |
| 5,880,627 | 3/1999 | Thiel ...................................... 327/562 |

OTHER PUBLICATIONS

Business Wire, "Micro Linear announces first single–chip power controller for notebook computers," Apr. 16, 1992, pp. 1–7.

Cassani, John, C.; Hodgins, Jonathan J.; Robert G. and Wittlinger, H.A., "Sophisticated Control IC Enhances 1 MHZ Current Controlled Regulator Performance," Proceedings of HFPC, pp. 167–173, May 1992.

Chetty, P.R., "DC timers control dc–dc converters" Electronics, pp. 121 & 123, Nov. 13, 1975.

Chryssis, George , High–Frequency Switching Power Supplies, pp. 144–152, 180–181, 1989, No Month.

Dell Computer Corporation, "Dell Computer Corporation Introduces Advanced Notebook PC," (alleged to contain UC1895 (see Unitrode Advance Information Datasheet, Oct. 5, 1992), Sep. 1991, pp. 3432–3438.

Dinsmore, D., "Dual regulator handles two input voltages," EDN, Jan. 21, 1993, pp. 107 only.

Fisher, R. A. et al., "Performance of Low Loss Synchronous Rectifiers in a Series–Parallel Resonant DC–DC Converter," Proceedings of the Fourth Annual IEEE Applied Power Electronics Conference and Exposition, pp. 240–246, Mar. 1989.

Gauen, Kim, "Synchronous Rectifier Improves Step–Down Converter Efficiency," PCIM, pp. 8, 11–12 & 14–15, Apr. 1993.

Gontowski et al., "Advanced New Integrated Circuits For Current–Mode Control," Proceedings of the Power Electronics Show and Conference, pp. 341–352, Oct. 1988.

Goodenough, F., "Raise Switcher Efficiency Above 90%", Electronic Design, Jan. 21, 1993, pp. 107–112.

Goodenough, Frank, "Low–Voltage Analog ICs Wait in the Wings," Electronic Design, Sep. 3, 1992, pp. 37–49.

Goodenough, Frank, "Synchronous Rectifier UPS PC Battery Life," Electronic Design, pp. 47–53, Apr. 16, 1992.

Goodenough, F., "Dozing IC Op Amps Wake Up For Input Signal," Electronic Design, Dec. 5, 1991, pp. 49–54.

Gracie, Paul D., "Intermittent Converter Saves Power," EDN, p. 151, Sep. 1, 1989.

Grant, Duncan A. et al., "Power MOSFETs, Theory and Application," pp. 239–256, Wiley–Interscience, 1989, No Month.

Harris Semiconductor, "HIP 5060 Power Control IC Single Chip Power Supply", Datasheet, Apr. 1994, pp. 47–52.

Harris Semiconductor, "HIP 5060 Power Control IC Single Chip Power Supply", Datasheet, May 1992, pp. 1–3.

Harris Semiconductor, "HIP 5060 Power Control IC Single Chip Power Supply", Preliminary Datasheet, Jan. 1992, pp. 1–3.

Harris Semiconductor, Hodgins et al., "HIP 5060 Family of Current Mode Control ICs Enhance 1 MHZ Regulator Performance," Application Note AN9212.1, pp. 11–191–11–197, 1992, No Month.

Hewett, S., "Improved Switched Mode Power Supply Regulation by Eliminating Turn–off Spikes," IBM Technical Disclosure Bulletin, vol. 31, No. 4, pp. 97–98, Sep. 1988.

Hnatek, Eugene R. " Design of Solid State Power Supplies", 3rd Ed., pp. 65–70, 1989, No Month.

Horowitz & Hill, "The Art of Electronics," pp. 356–359, Cambridge University Press, 1989, No Month.

Ikeda, S. et al., "Power MOSFET for Switching Regulator," International Telecommunications Energy Conference, Oct. 1982, pp. 1–3.

Impala Linear, "ILC6350 Dual Output Synchronous Step–Down DC–DC Controller," Advanced Information Preliminary Datasheet, pp. 1–6, Jan. 1997.

Impala Linear, "ILC6311 Synchronous 3A Switching Regulator With Auto–Light Load Mode ," Preliminary Datasheet, pp. 30–38, Jan. 1997.

Impala Linear, "ILC6310 Synchronous Step–down DC–DC Converter With Auto Light–Load Mode Select," Final Datasheet, pp. 21–38, Jun. 1996.

Impala Linear, "ILC6330 13A Adjustable Synchronous DC–DC Controller," Preliminary Datasheet, pp. 39–41, Jun. 1996.

International Rectifier, "IR Application Note AN–978, HV Floating MOS–Gate Driver ICs, A Typical Block Diagram," Application Note from web page, Date Unknown, No Date pp. 1–9.

International Rectifier, "IR Application Note AN–978, HV Floating MOS Gate Driver ICs, Full Bridge With Current Mode Control," Application Note from web page, Date Unknown, No Date pp. 1–3.

International Rectifier, Clemente et al., "HV Floating MOS–Gate Driver IC," Application Note AN–978A, 1990, No Month pp. 1–7.

Kassakian, J. et al., "Principles of Power Electronics," pp. 103–165, Addison–Wesley Publishing Company, 1991, No Month.

Kerridge, Brian, "Battery power breeds efficient regulators," EDN, pp. 103–108, Mar. 18, 1993.

Lee, et al., "Design of Switching Regulator with Combined FM and On–Off Control," IEEE Transactions on Aerospace and Electronic Systems, vol. AES–22, No. 6, pp. 725–731, Nov. 1986.

Lee, Y. S. and Cheng, Y. C., "A 580 kHz switching regulator using on–off control," Journal of the Institution of Electronic and Radio Engineers, vol. 57, No. 5, pp. 221–226, Sep. 1987.

Linear Technology, "LT1271/LT1269 4A High Efficiency Switching Regulators," Datasheet, 1992, No Month pp. 1–4.

Linear Technology, "LT1432 5V High Efficiency Step–Down Switching Regulator Controller," Datasheet, 1992, No Month pp. 1–27.

Linear Technology, "LT1170/LT1171/LT1172 100kHz, 5A, 2.5A and 1.25A High Efficiency Switching Regulators," Datasheet, 1991, No Month pp. 1–16.

Linear Technology, "LT1524/LT3524 Regulating Pulse Width Modulator," 1990, No Month pp. 85–92.

Linear Technology, "LT1072 1.25A High Efficiency Switching Regulator," Datasheet, 1990, No Month pp. 49–60.

Linear Technology, "LT1074 Switching Regulator," Preliminary Datasheet, Jun. 1989, pp. 21–26.

Linear Technology, Nelson, C., App. Note 19, "LT–1070 Design Manual," Jun. 1986, pp. 1–76.

Linear Technology, Pietkiewicz et al., "DC–DC Converters for Portable Computers," Design Note 52, 1991, No Month pp. 1–2.

Linear Technology, Wilcox, M., "LT1158 Half Bridge N–Channel Power MOSFET Driver," Datasheet, 1992, No Month pp. 1–5.

Linear Technology, Williams, J., App. Note 35, "Step Down Switching Regulators," Aug. 1989, pp. 1–7.

Linear Technology, Williams, J. et al., App. Note 29, "Some Thoughts on DC–DC Converters," Oct. 1988, pp. 1–4.

Linear Technology, Williams, J., App. Note 25, "Switching Regulators for Poets," Sep. 1987, pp. 1–3.

Markus, John, "Guidebook of Electronic Circuits," pp. 647 & 649, 1971, No Month.

Maxim Integrated Products, "MAX1630–MAX1635 Multi–Output, Low–Noise Power Supply Controllers for Notebook Computers," Datasheet, Apr. 1997, pp. 1–28.

Maxim Integrated Products, "MAX798 High–Accuracy Step–Down Controller With Synchronous Rectifier for CPU Power," Datasheet, Dec. 1996, pp. 1–12.

Maxim Integrated Products, "MAX887 100% Duty Cycle, Low–Noise, Step–Down, PWM DC–DC Converter," Datasheet, Sep. 1996, pp. 1–12.

Maxim Integrated Products, "MAX777L/MAX778L/MAX779L Low–Voltage Input, 3V/3.3V/5V Adjustable Output, Step–UP DC–DC Converters," Datasheet, Jul. 1996, pp. 1–9.

Maxim Integrated Products, "MAX796/MAX797/MAX799 Step–Down Controllers With Synchronous Rectifier for CPU Power," Datasheet, Nov. 1994, pp. 109–140.

Maxim Integrated Products, "MAX782 Triple–Output Power–Supply Controller for Notebook Computers," Datasheet, May 1994, pp. 1–32.

Maxim Integrated Products, "MAX783 Triple–Output Power–Supply Controller for Notebook Computers," Datasheet, May 1994, pp. 1–28.

Maxim Integrated Products, "MAX746 High–Efficiency, PWM, Step–Down, N–Channel DC–DC Controller," Datasheet, Nov. 1993, pp. 1–8.

Maxim Integrated Products, "MAX747 High–Efficiency PWM, Step–Down P–Channel DC–DC Controller," Datasheet, Sep. 1993, pp. 1–8.

Maxim Integrated Products, "MAX782/MAX786 Notebook Computer Power Supplies," Advance Information Datasheet, Feb. 1993, pp. 1–8.

Maxim Integrated Products, "MAX635/636/637 Preset/Adjustable Output CMOS Inverting Switching Regulators," Datasheet, Date Unknown, No Date pp. 882–889.

Meakin, Mike, "The LM3578 Switching Power Regulator," Electronic Engineering, pp. 47–52, Jul. 1986.

Micro Linear, "ML4862 Battery Power Control IC," Datasheet, Jan. 1997, pp. 1–12.

Micro Linear, "ML4873 Battery Power Control IC," Advance Information Datasheet, Mar. 15, 1993, pp. 1–8.

Micro Linear, "ML4873 Battery Power Control IC," Datasheet, Jan. 1997 (preliminary version Mar. 1993—cited above), pp. 1–12.

Micro Linear, "ML4862 Battery Power Control IC," Datasheet, Jul. 1992, pp. 1–12.

Micro Linear, "ML4862 EVAL User's Guide," Jun. 1992, pp. 1–9.

Micro Linear, "ML 4822 DC/DC Converter Controller for Portable Computers," Datasheet, Aug. 1991, pp. 1–3.

Myers, R. and Peck, R., "200–kHz Power FET Technology in New Modular Power Supplies," Hewlett–Packard Journal, Aug. 1981, pp. 1–10.

NASA Jet Propulsion Laboratory, "Synchronous Half–Wave Rectifier," Jul. 1989, 1 page.

National Semiconductor Corporation, "LM1578/LM2578/LM3578 Switching Regulator," Preliminary Datasheet, 1987, pp. 195–201 No Month.

Patel, R., "Bipolar synchronous rectifiers cut supply losses," EDN, Apr. 4, 1985, pp. 199–204.

Patel, Raoji, "Using Bipolar Synchronous Rectifiers Improves Power Supply Efficiency," Proceedings of the Power Sources Conference, Nov. 1984, pp. 530–547.

Quinnell, Richard A., "Analog IC Combines Five Functions for Battery Power Management," EDN, Apr. 23, 1992, pp. 3095–3099.

Redl, et al., "Overload–Protection Methods For Switching–Mode DC/DC Converters: Classification, Analysis, and Improvements," PESC '87 Record, pp. 107–118, 1987, No Month.

Redl et al., "Frequency Stabilization and Synchronization of Free–Running Current–Mode Controlled Converters," PESC '86 Record, pp. 519–530, 1986, No Month.

Rippel, W.E., "Synchronous Half–Wave Rectifier," JPL Technical Support Package, Jul. 1989, pp. 462–466.

Sakai, E. and Harada, K., "A New Synchronous Rectifier Using Bipolar Transistor Driven by Current Transformer," Fourteenth International Telecommunications Energy Conference, pp. 424–429, Oct. 1992.

Sakai, E. and Harada, K., "Synchronous Rectifier Using a Bipolar Transistor Driven by Current Transformer," Journal of the Society of Electronic Data Communication, vol. J–74–B–I, No. 8, pp. 639–646, Aug. 1991 (in Japanese, with translation).

Savant, C.J., Jr., et al., "Electronic Design: Circuits and Systems," pp. 612–613, The Benjamin/Cummings Publishing Co., 1991, No Month.

Shepard, J., "Powering portable systems," EDN, Nov. 5, 1992, pp. 3109–3111.

Siliconix, "Si9150 Synchronous Buck Regulator Controller, S–42677, Rev. D," Datasheet, Feb. 14, 1995, pp. 3478–3482.

Siliconix, "Si9150CY/BCY Synchronous Buck Converter Controller," Preliminary Data Sheet, Oct. 8, 1992, pp. 19–24.

Siliconix, "Designing DC/DC Converters with the Si9110 Switchmode Controller," Siliconix Power Products Data Book, 1991, No Month pp. 61–77.

Siliconix, "Si9XX Synchronous Buck Controller," Datasheet, Dec. 20, 1990 1 page.

Siliconix, "Siliconix Si9110/Si9111," Datasheet, Oct. 1987, pp. 1–13.

Siliconix, "Synchronous Rectification," Design Ideas, Oct. 1980, pp. 1–2.

Siliconix, "High–Efficiency Buck Converter for Notebook Computers," Application Note AN92–4, Date Unknown, No Date pp.

Soclof, Sidney, "Applications of Analog Integrated Circuits," Figure 2.25, pp. 74–75, Prentice–Hall, Inc. 1985, No Month pp. 1–2.

Sokal et al., "Control Algorithms and Circuit Designs For Optimally Flyback–Charging an Energy–Storage Capacitor," IEEE Fifth Applied Power Electronics Conference, pp. 295–301, 1990, No Month.

Steigerwald, R., "High–Frequency Resonant Transistor DC–DC Converters," IEEE Transactions on Industrial Electronics, vol. IE–31, No. 2, pp. 181–191, May 1984.

Toyota, "SB3052P Dual Channel Step Down DC–DC Converter Controller," Datasheet, Feb. 1998, pp. 1–10.

Toyota, "SB3011P Step Down DC–DC Converter Controller," Datasheet, Mar. 1997, pp. 67–71.

Toyota, "SB3012P Step Down DC–DC Converter Controller," Datasheet, Mar. 1997, pp. 17–25.

Toyota, "SB3013P Step Down DC–DC Converter Controller," Datasheet, Mar. 1997, pp. 72–77.

Toyota, "SB3020P Dual Channel Step Down DC–DC Converter Controller," Datasheet, Mar. 1997, pp.

Toyota, "SB3050P Dual Channel Step Down DC–DC Converter Controller," Datasheet, Mar. 1997, pp.

Toyota, "SB3030P Step Down DC–DC Converter Controller," Datasheet, Dec. 1996, pp. 26–28.

Toyota, "SB3031P Step Down DC–DC Converter Controller," Datasheet, Dec. 1996, pp. 29–31.

Toyota, "SB3010P Synchronous Stepdown DC–DC Converter Controller," Datasheet Aug. 10, 1995, pp. 3–16.

Uchida, Takahito, "Switching Regulator Controller," Japanese Inventor Associated Disclosed Technology Publication No. 92–2362, published Feb. 15, 1992 (in Japanese, with translation).

Unitrode, "UCC19411/2/3, UCC29411/2/3, UCC39411/2/3 Low Power Synchronous Boost Converter," Preliminary Datasheet, Apr. 1998, pp. 1–9.

Unitrode, "UCC3941–3/–5/–ADJ 1V Synchronous Boost Converter," Preliminary Datasheet, Mar. 1997, pp. 1–9.

Unitrode, "UCC1582, UCC2582, UCC3582 High Efficiency Synchronous, Step Down Controller," Preliminary Datasheet, Jan. 1997, pp. 1–4.

Unitrode, "UC1895, UC2895, UC3895 Synchronous Rectifier Buck PWM Controller," Advance Information Datasheet, Oct. 5, 1992, 6 page.

Unitrode, "Using Bipolar Synchronous Rectifiers Improves Power Supply Efficiency," Application Note, Jun. 1985, pp.

Wilcox, M., "The LT1158: Low Voltage, N–Channel Bridge Design Made Easy," Linear Technology, Feb. 1992, pp.

Williams, J., "Designing supplies for powering LCD backlighting," EDN, Oct. 29, 1992, pp. 125–136.

Williams, J., "1.5 to 5V converter supplies 200mA," EDN, Oct. 15, 1992, pp. 139–140.

Williams, J., "Correcting power–supply problems," EDN, Dec. 10, 1991, pp. 181–190.

Williams, Jim, "Basic Principles and Ingenious Circuits Yield Stout Switchers," EDN, Jan. 19, 1990, pp. 151–166.

Williams, J., "Astute designs improve efficiencies of linear regulators," EDN, Aug. 17, 1989, pp. 151–158.

Williams, J., "Design linear circuits that serve digital system needs," EDN, Apr. 27, 1989, pp. 165–176.

Williams, J., "Clever techniques improve thermocouple measurements," EDN, May 26, 1988, pp. 145–160.

Williams, J., "Galvanically isolated switching supplies provide high power," EDN, Nov. 26, 1987, pp. 191–200.

Williams, J., "Regulator IC speeds design of switching power supplies," EDN, Nov. 12, 1987, pp. 193–200.

Williams, J., "Signal conditioning circuits use $\mu$power design techniques," EDN, Aug. 20, 1987, pp. 219–234.

Williams, J., "Micropower circuits assist low–current signal conditioning," EDN, Aug. 6, 1987, pp. 123–131.

Williams, J., "Switching regulator takes on more power," Electronic Product Design, Jan. 1986, pp. 25–28.

Williams, J., "Considerations for Five Volt Linear Circuits," Professional Program Session Record 20, Circuits for Analog Signal Processing and Data Conversion in Single +5V Supply Systems, Wescon/85, Nov. 1985, pp. 1–6.

Williams, J., "Analog circuits operate from a 1.5V cell," EDN, Sep. 19, 1985, pp. 195–204.

Williams, J., "Refine V/F–converter operation with novel design techniques," EDN, May 30, 1985, pp. 239–248.

Williams, J., "Design techniques extend V/F–converter performance," EDN, May 16, 1985, pp. 153–164.

Williams, J., "Design linear circuits for 5V operation," EDN, May 2, 1985, pp. 163–174.

Williams, J., "Chopper amplifier improves operation of diverse circuits," EDN, Mar. 7, 1985, pp. 189–207.

Williams, J., "Use low–power design methods to condition battery outputs," EDN, Oct. 18, 1984, pp. 307–318.

Williams, J., "Special circuit–design techniques enhance regulator performance," EDN, Sep. 1, 1983, pp. 135–144.

Williams, J., "Conversion techniques adapt voltages to your needs," EDN, Oct. 10, 1982, pp. 155–168.

Williams, J., "Design dc–dc converters to catch noise at the source," Electronic Design, Oct. 15, 1981, pp. 229–232.

Williams, J., "Employ pulse–width modulators in a wide range of controllers," EDN, Sep. 2, 1981, pp. 201–205.

Williams, J., "Bridge forms synchronous rectifier," EDN, Date Unknown, 1 page No Date.

Williams, J. and Huffman, B., "Switched–capacitor networks simplify dc/dc–converter designs," EDN, Oct. 24, 1988, pp. 171–175.

Williams, J. and Huffman, B., "Design dc/dc converters for power conservation and efficiency," EDN, Oct. 10, 1988, pp. 209–224.

Williams, J. and Huffman, B., "Proper instrumentation eases low–power dc/dc–converter design," EDN, Oct. 27, 1988, pp. 285–291.

Williams, J. and Huffman, B., "Precise converter designs enhance system performance," EDN, Oct. 13, 1988, pp. 175–185.

Williams, J. and Dendinger, S., "Simplify feedback controllers with a 2–quadrant PWM IC," EDN, May 26, 1983, pp. 211–222.

Williams, J. and Waller, B., "Performance–Enhancement Techniques for Three–Terminal Regulators," New Electronics, Oct. 4, 1983, pp. 61–65.

CIRCUIT AND METHOD FOR REDUCING QUIESCENT CURRENT IN A SWITCHING REGULATOR

BACKGROUND OF THE INVENTION

This invention relates to voltage regulators. More particularly, this invention relates to circuits and methods for reducing the quiescent current in switching voltage regulators.

The purpose of a voltage regulator is to provide a predetermined and substantially constant output voltage to a load from a poorly-specified and fluctuating voltage source. One type of voltage regulator commonly used to accomplish this task is a switching voltage regulator. Switching voltage regulators are typically arranged to have a switching element (e.g., a power transistor) and an inductor coupled between the voltage source and the load. The switching regulator regulates the voltage across the load by turning the switching element ON and OFF so that power is transmitted through the switching element and into the inductor in the form of discrete current pulses. The inductor and an output capacitor then convert these current pulses into a steady load current so that the load voltage is regulated.

To generate a stream of current pulses, switching regulators include control circuitry that commands the switching element ON and OFF. The duty cycle of the switching element (i.e., the amount of time the switching element is ON compared to the period of an ON/OFF cycle), which controls the flow of current into the load, can be varied by a variety of methods. For example, the duty cycle can be varied by fixing the pulse stream frequency and varying the ON or OFF time of each current pulse, or by fixing the ON or OFF time of each current pulse and varying the pulse stream frequency.

Because switching regulators can operate at high levels of efficiency, they are often used in battery operated systems such as notebook computers, cellular telephones, and hand-held instruments. In such systems, when the regulator is supplying close to its rated output current, the efficiency of the overall circuit is usually high. However, this efficiency is generally a function of output current and typically decreases when the switching regulator is providing small amounts of current. This reduction in efficiency is generally attributable to the losses associated with operating the switching regulator. These losses include, among others, quiescent current losses, losses in the control circuit of the switching regulator, switching element losses, switching element driver losses, and inductor/transformer winding and core losses.

The reduction in efficiency of switching regulators at low output currents is of concern to circuit designers. This is because it is common for battery operated devices to experience short periods of high power use (i.e., periods during which relatively large currents must be supplied to a load), followed by extended periods of low power use (i.e., "standby" time during which a very small load current flows, but a regulated output voltage must be maintained). If the standby periods far exceed the usage periods, the quiescent current (i.e., the input current that flows into the switching regulator when the output is unloaded but still in voltage regulation) will determine the effective life of the battery. Accordingly, it is desirable to reduce quiescent current consumption as much as possible to extend battery life.

In the past, numerous techniques have been employed to reduce quiescent current losses in switching regulators during standby periods. For example, a switching regulator such as the LT1070 from Linear Technology Corporation, Milpitas, Calif., uses a control circuit that includes a comparator circuit and an error amplifier for monitoring the regulated output signal. When the output of the error amplifier drops below a threshold voltage, the regulator shuts down some of its internal circuitry to reduce quiescent current levels.

Other switching regulators from Linear Technology Corporation, such as the LT1307, LT1500, and LTC1625 use a mode of operation called "Burst Mode™" to reduce quiescent current. This mode of operation recognizes that the efficiency of a typical switching regulator drops off as the load decreases, because a fixed amount of power is wasted in the switch drive circuitry that is independent of load size. These switching regulators reduce quiescent current by holding the switching transistor(s) OFF, and turns OFF unneeded internal circuits, when the load current drops below a certain value.

A typical prior art current-mode stepdown switching regulator 100 employing burst mode operation is shown in FIG. 1. Voltage regulator 100 generally comprises an output circuit 110, a control circuit 130, and a filter circuit 125.

The voltage regulator of FIG. 1 operates as follows. A switch timing circuit 101 (which may be, for example, a one-shot, an oscillator, or any other suitable circuit) within control circuit 130 supplies a control signal SW ON that sets a latch 104. While latch 104 is set, a switch driver 106 provides a signal to output circuit 110 that causes a switch 108 in output circuit 110 to turn ON and provide current from an input voltage source VIN to an output node 117. Latch 104 remains set until an output signal from a current comparator 102 causes latch 104 to reset. When reset, latch 104 turns switch 108 OFF so that current is no longer drawn from VIN. Current comparator 102 determines when to reset latch 104 by comparing a current signal ($I_L$) from output circuit 110 with a current threshold value ($I_{TH}$) generated by an error amplifier 122 in control circuit 130 (discussed in more detail below).

The primary purpose of output circuit 110 is to provide current pulses as directed by control circuit 130 and to convert those current pulses into a substantially constant output current. Output circuit 110 includes power switch 108 coupled to VIN and a node 109, a catch diode 112 coupled from node 109 to ground, an inductor 114 coupled from node 109 to output node 117, a capacitor 116 coupled from output node 117 to ground, and a voltage divider formed by resistors 118 and 120 coupled from node 117 to ground. Although switching element 108 is depicted as a field-effect transistor (FET) in FIGS. 1 and 2, any other suitable switching element may be used if desired.

The operation of output circuit 110 can be divided into two periods. The first is when power switch 108 is ON, and the second is when power switch 108 is OFF. During the ON period, current passes from VIN through switch 108 and flows through inductor 114 to output node 117. During this period diode 112 is reverse-biased. However, after power switch 108 turns OFF, inductor 114 still has current flowing through it. The former current path from VIN through switch 108 is now open-circuited, causing the voltage at node 109 to drop such that catch diode 112 becomes forward-biased and starts to conduct. This maintains a closed current loop through a load (not shown). When power switch 108 turns ON again, the voltage at node 109 rises such that diode 112 becomes reverse-biased and turns OFF.

As shown in FIG. 1, error amplifier 122 in control circuit 130 senses the output voltage of regulator 100 via a feedback signal $V_{FB}$ produced by resistors 118 and 120. Error amplifier 122, which is preferably a transconductance amplifier, compares $V_{FB}$ with a reference voltage ($V_{REF}$) that is also connected to amplifier 122. An output signal, $I_{TH}$, is generated in response to this comparison. The $I_{TH}$ signal is filtered by a filter circuit 125 comprised of resistor 124 and capacitor 126 and coupled to an input of current comparator 102. The value of $I_{TH}$ sets the point at which current comparator 102 trips.

An input of a burst comparator 128 in control circuit 130 is also coupled to the output of error amplifier 122 and receives the filtered $I_{TH}$ signal. Burst comparator 128 monitors $I_{TH}$ as an indication of load current and compares the filtered $I_{TH}$ signal with a voltage potential V1 that is connected to another input burst comparator 128. V1 is typically set to a value that represents the minimum current value for which it is desirable to maintain regulator 100 in the normal operating mode. This is usually a fraction of the maximum rated output current for regulator 100. When $I_{TH}$ decreases to or below the value of V1, burst comparator 128 trips, sending a SLEEP signal to the shutdown enable inputs of current comparator 102 and switch timing circuit 101. This shuts down current comparator 102 and switch timing circuit 101, maintains switch 108 OFF, and thus places voltage regulator 100 in a standby mode so that quiescent current is reduced. While in standby mode, capacitor 116 supports the load and no switching losses are incurred. When the output voltage $V_{OUT}$ has decayed slightly, causing the $I_{TH}$ voltage to increase by the amount of the hysteresis in burst comparator 128, the SLEEP output of comparator 128 is de-asserted and normal operation resumes.

When a large load step is applied to voltage regulator 100, the current drawn from regulator 100 increases. This causes a slight reduction in the value of $V_{FB}$ which, in turn, causes $I_{TH}$ to increase. The increase in $I_{TH}$ raises the threshold point at which current comparator 102 trips, resulting in an increase in the current supplied by the regulator to match the required load current.

However, when the demand for load current decreases, switching element 108 will continue to turn ON each cycle as directed by control circuit 130, but the value of $I_{TH}$ will decrease in order to turn switching element 108 OFF at lower currents. Switching element 108 therefore continues to switch at the same frequency, but it conducts less current as the load current decreases, causing switching losses to become a larger percentage of the output power.

As the load current decreases further, $I_{TH}$ periodically drops below V1 and voltage regulator 100 begins to experience standby periods. As the demand for load current drops even further, the standby periods become longer. Finally, voltage regulator 100 enters a prolonged standby state in which substantially no current is supplied to the load. When this occurs, the operating intervals become so infrequent that the input current to voltage regulator 100 is essentially defined by the quiescent current alone.

One significant limitation in the amount of quiescent current reduction possible in voltage regulator 100 is the need of error amplifier 122 to quickly slew filter circuit 125 when transitioning from standby mode to normal operating mode. Such a transition is necessary, for example, when a large load step is placed on voltage regulator 100 during a standby period. If the output current of error amplifier 122 cannot slew filter circuit 125 as fast as the load current is slewing output capacitor 116, the recovery time from standby periods will be extended. This undesirably causes the output voltage ($V_{OUT}$) to undershoot.

In addition, because the value of capacitor 126 is typically large enough such that filter circuit 125 provides adequate filtering, slewing filter circuit 125 requires a relatively large output current capability from error amplifier 122. Accordingly, amplifier 122 must constantly be able to supply this current so that regulator 100 can quickly respond to large load steps, even when it is in a standby state. As a result, amplifier 122 must undesirably draw substantial amounts of quiescent current even while regulator 100 is in a standby period.

Other prior art voltage regulators which operate at low quiescent currents are also presently available. For example, the LT1316 and LTC1474 from Linear Technology Corporation are able to operate at extremely low quiescent currents while in standby mode by replacing the above-described error amplifier with a micropower comparator that uses a voltage reference as a fixed comparator threshold. This type of regulator determines when to enter and exit standby periods by comparing the load voltage (which is indicative of load current) with the fixed voltage reference. Thus, during standby periods, only the fixed voltage reference and a micropower comparator circuit are active, which significantly reduces the quiescent current required by the regulator. However, because this type of regulator usually employs a fixed current threshold, it cannot adaptively increase the threshold value with increasing load current, which may limit the regulator's response to large current demands.

In view of the foregoing, it would be desirable to provide a circuit and method for operating switching mode voltage regulators at very low quiescent current levels during standby periods and yet provide large output current during periods of normal operation.

It would also be desirable to provide a circuit and method for allowing a fast transition in switching regulators from a low-output current, very low-power consumption state (standby or burst mode) to a high-current output state by optimizing the response time of control circuitry in the switching regulators during the transition period.

SUMMARY OF THE INVENTION

It is therefore an object of the present invention to provide a circuit and method for operating a switching voltage regulator at a very low quiescent current during standby periods and yet provide large output current during periods of normal operation.

It is another object of the present invention to provide a circuit and method for allowing a fast transition in switching regulators from a low-output current, very low-power consumption (standby mode) to a high-current or normal output state by optimizing the response time of feedback circuitry in the voltage regulator during the transition period.

In accordance with these and other objects of the present invention, a switching voltage regulator capable of operating at reduced quiescent currents is described. The voltage regulator includes an error amplifier in a control circuit to monitor inductor current as an indication of output current (although voltage mode regulators are also possible). When the output current drops below a pre-determined value, the output of the error amplifier also drops to a threshold value where the voltage regulator enters a standby mode of operation during which the switching transistor is maintained OFF and unneeded circuitry is shut down to reduce quiescent current consumption. In addition, while in standby mode, the error amplifier is placed in a micropower operating state to further reduce current consumption and the filter circuitry coupled to the error amplifier is disconnected and coupled to a "parking" voltage. The disconnection reduces capacitive loading on the error amplifier while it is in the micropower operating state, allowing the amplifier upon exiting the standby mode to rapidly slew in response to rapidly changing output requirements. The parking voltage is preferably at a value such that when normal operation resumes, and the filter circuitry is reconnected to the error amplifier, the voltage regulator will not immediately transition back to standby mode. The voltage regulator thus will re-enter burst mode only when the output of the error amplifier, operating at its normal current, again slews below the standby mode threshold value.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE INVENTION

Figure 1:
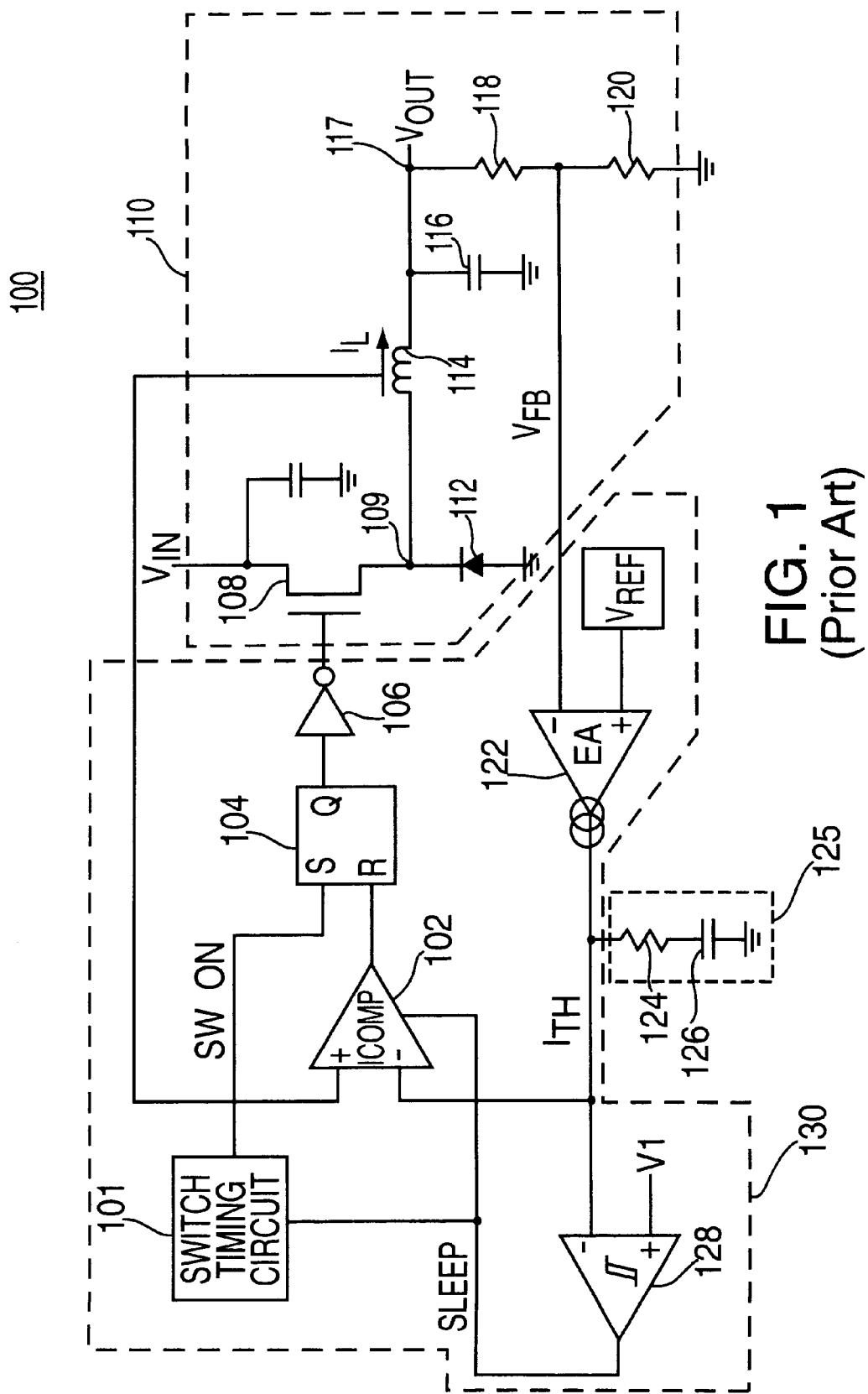
FIG. 1 is a schematic diagram of a prior art switching voltage regulator circuit.
Figure 2:
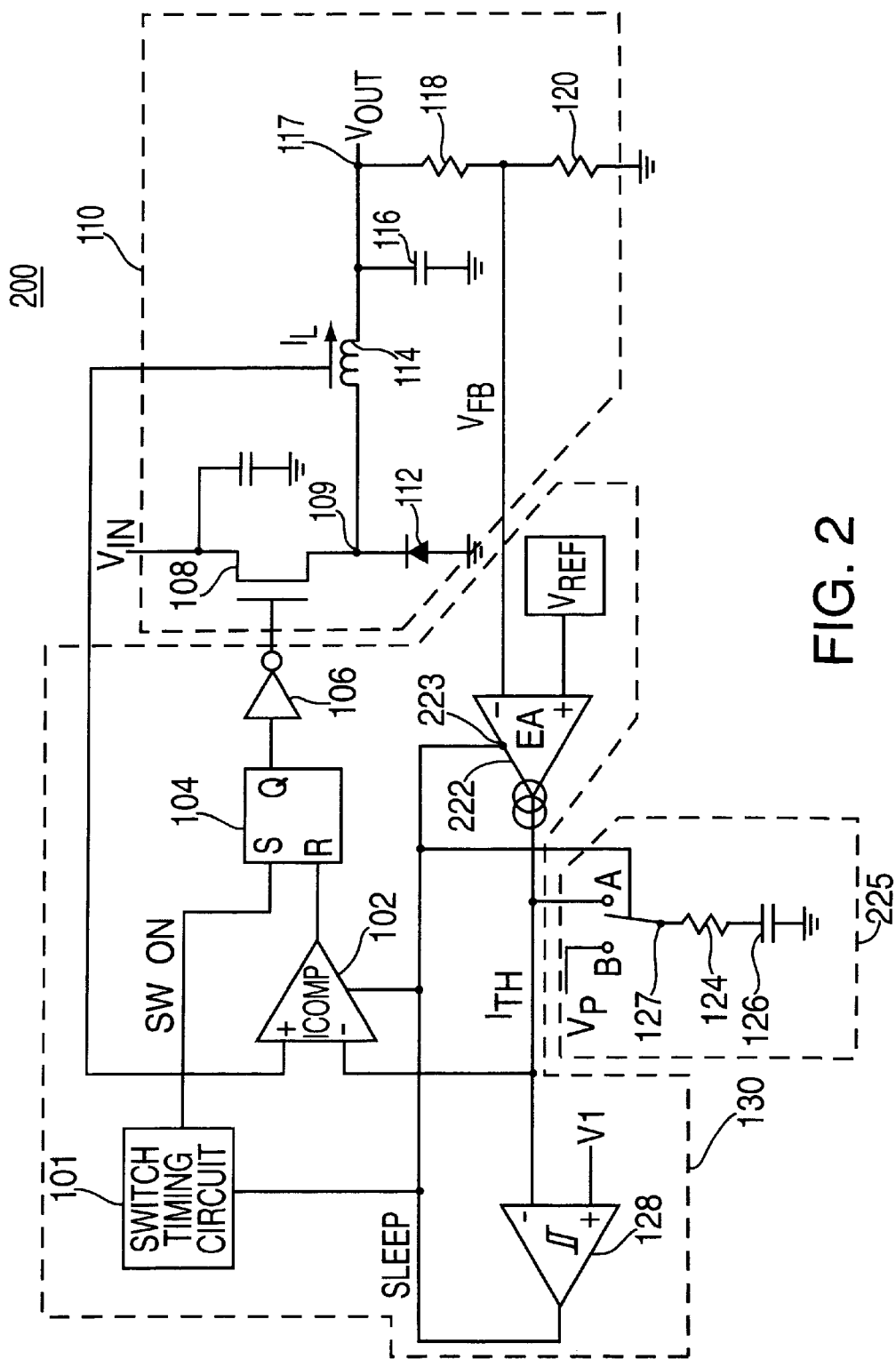
FIG. 2 is a schematic diagram of an exemplary embodiment of a switching voltage regulator constructed in accordance with principles of the present invention.

A current-mode switching regulator 200, which is constructed in accordance with the principles of the present invention, is shown in FIG. 2. As in FIG. 1, the regulator of FIG. 2 includes switch timing circuit 101, current comparator 102, latch 104, switch driver 106, output section 110, and comparator 128.

Regulator 200 has been improved as compared to the regulator of FIG. 1, however, by the addition of two-position switch 127 in filter circuit 225 and error amplifier 222 (which replaces error amplifier 122) that has a selectively enablable micropower mode. As FIG. 2 shows, switch 127 (which is preferably implemented using transmission gates (FIG. 3), although substantially any conventional switching circuitry may be used if desired), is coupled to selectively connect filter circuit 225 (i.e., switch 127, resistor 124, and capacitor 126) either to the output of error amplifier 222 (position A) or to a parking voltage $V_P$ (position B). Switch 127 is controlled by a SLEEP signal that is generated by comparator 128. The SLEEP signal is also coupled to a MICROPOWER ENABLE input 223 of error amplifier 222, to selectively control whether the error amplifier is in a normal or micropower operating state.

Figure 3:
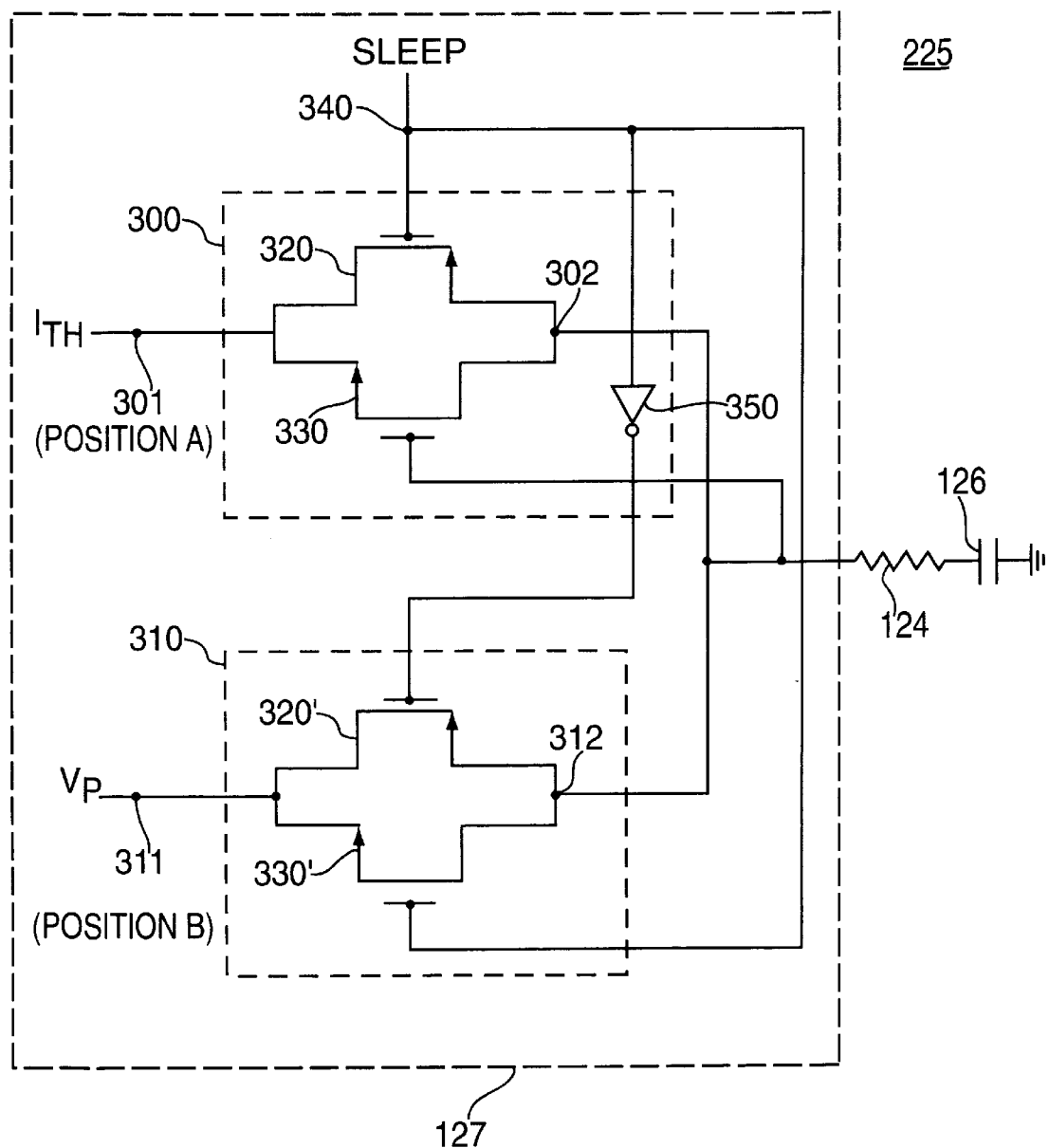
FIG. 3 is a schematic diagram of an illustrative embodiment of a switching circuit in accordance with principles of the present invention.

As shown in FIG. 3, switch 127 may be implemented using parallel-coupled transmission gates 300 and 310. Transmission gates 300 and 310 may include N-channel MOSFETs (NMOS) 330 and P-channel MOSFETs (PMOS) 320 that are connected to one another such that the drain of PMOS 320 is connected to the source of NMOS 330 and vice versa (although this may "switch" during operation). An inverter 350 is connected between the gates of the transistors within transmission gate 300 (i.e., PMOS 320 and NMOS 330) so that a signal applied to the gate of one transistor (e.g., PMOS 320) is inverted at the gate of the other transistor (e.g., NMOS 330). This allows both transistors of transmission gate 300 to be ON or OFF when control input 340 is low (de-asserted) or high (asserted), respectively. The opposite is true for transmission gate 310 (i.e., gate 310 is OFF when control input 340 is low and ON when control input 340 is high).

As FIG. 3 shows, input 311 of transmission gate 310 is connected to parking voltage $V_P$ (position B) and input 301 of transmission gate 300 is connected to the $I_{TH}$ signal (position A) at the output of error amplifier 222. Control input 340 is connected to the SLEEP signal at the output of comparator 128 and to the gates of PMOS and NMOS transistors within transmission gates 300 and 310. If the signal applied to control input 340 is de-asserted low, NMOS 330' and PMOS 320' in transmission gate 310 are OFF while NMOS 330 and PMOS 320 in transmission gate 300 are ON. This allows the $I_{TH}$ signal from the output of error amplifier 222 to pass from input 301 of transmission gate 300 to output 302. In this way, filter circuit 225 may be selectively connected to the output of error amplifier 222.

However, if the signal applied to control input 340 is asserted high, NMOS 330' and PMOS 320' in transmission gate 310 are ON while NMOS 330 and PMOS 320 in transmission gate 300 are OFF. This allows parking voltage $V_P$ to pass from input 311 of transmission gate 310 to output 312. In this way, filter circuit 225 may be selectively connected to the parking voltage $V_P$. Because the NMOS and PMOS transistors of only one transmission gate (300 or 310) can be ON at any given time, either the parking voltage $V_P$ or the $I_{TH}$ signal from the output of error amplifier 222 can be connected to filter 225.

Although the circuit of FIG. 3 is shown using PMOS transistors 320 and 320', one skilled in the art will appreciate that transmission gates 300 and 310 could be implemented using only NMOS transistors 330 and 330' if the $V_P$ and $I_{TH}$ voltages are about one volt or more below the value of the asserted SLEEP signal.

During normal operation, when regulator 200 is providing medium to large load currents, the $I_{TH}$ voltage is above threshold voltage $V_1$ and the SLEEP signal is de-asserted low, causing switch 127 to be in position A. In position A, the filter components of filter circuit 225 (i.e., resistor 124, and capacitor 126) are connected to the output of error amplifier 222, and operation is identical to regulator 100 shown in FIG. 1. As in FIG. 1, a decrease in load current also causes $I_{TH}$ to decrease until it reaches voltage potential $V_1$. When this occurs, BURST comparator 128 trips and asserts the SLEEP signal to place regulator 200 in a standby state. In this state, as in the case of FIG. 1, switching transistor 108 is maintained OFF and switch timing circuit 101 and comparator 102 are also turned OFF. In addition, however, assertion of the SLEEP signal: (1) switches switch 127 from position A to position B, thereby de-coupling filter circuit 225 from $I_{TH}$ and coupling the filter circuit 225 to parking voltage $V_P$, and (2) causes error amplifier 222 to enter a micropower mode of operation (via assertion of SLEEP at micropower enable input 223). When error amplifier 222 is in the micropower mode, its operating current is reduced by a large factor (e.g., 10 or more), in order to reduce its quiescent current to that comparable to a micropower comparator.

At the instant that BURST comparator 128 trips to assert the SLEEP signal, the output of error amplifier 222 was sinking current, causing the voltage on capacitor 126 to discharge. When filter circuit 225 is disconnected from the output of error amplifier 222, any excess sinking current pulls $I_{TH}$ down further, ensuring that the standby interval is continued. Because the SLEEP signal also places the error amplifier in a micropower state, which starves the amplifier of operating current, its ability to slew current-drawing loads (e.g., capacitive loads) is severely compromised. However, because filter circuit 225 has been disconnected from the output of error amplifier 222, the error amplifier no longer experiences a significant capacitive load from filter circuit 225. Thus, switching switch 127 from position A to position B significantly reduces the capacitive loading on control circuit 130. Accordingly, as VOUT decays during a standby period, the reduced output current of error amplifier 222 is still sufficient to rapidly slew the unloaded $I_{TH}$ line. When $I_{TH}$ subsequently increases above V1 (plus the hysteresis in comparator 128), the SLEEP signal is again de-asserted and normal operation of regulator 200 resumes.

During a standby period, switch 127 couples filter 225 to parking voltage $V_P$. This voltage is preferably made slightly larger than $V_1$, so that when filter circuit 225 is reconnected to the output of error amplifier 222 upon exiting standby mode, the voltage on $I_{TH}$ is above threshold voltage $V_1$. This prevents an immediate retrip of comparator 128, and a subsequent premature (and undesirable) re-entering of regulator 200 into standby mode. Regulator 200 will enter the standby mode again, by virtue of assertion of the SLEEP signal, only when the output of error amplifier 222, operating in its normal state, again slews $I_{TH}$ below $V_1$. In this way, standby mode operation with very little $V_{OUT}$ ripple can be obtained, since VOUT does not have to increase much for error amplifier 222 to slew $I_{TH}$ from $V_P$ to $V_1$ with filter circuit 225 connected, nor decrease much for the error amplifier to return $I_{TH}$ back above $V_1$ with filter circuit 225 disconnected.

Thus, a switching voltage regulator capable of reducing quiescent current without sacrificing response time when large currents are needed has been disclosed. Although the invention has been illustrated in the context of a step-down (buck) switching regulator, it is equally applicable to any other regulator topology such as boost, buck-boost, or inverting. Similarly, the invention has been illustrated in the context of a current-mode regulator loop, but could also be used with a voltage-mode regulator loop.

It also will be understood that the terms "asserted" and "de-asserted" are used herein only for convenience, and that no fixed logic levels are intended or should be inferred by their use. For example, a signal may be asserted high or low (and de-asserted in opposite fashion) as desired, without substantially affecting the operation of the invention disclosed herein.

Persons skilled in the art will thus appreciate that the present invention can be practiced by other than the described embodiments, which are presented for purposes of illustration and not of limitation, and that the present invention is limited only by the claims which follow.

What is claimed is:

1. A switching regulator circuit that:
   (1) provides a regulated voltage to an output terminal and (2) is capable of operating in a low quiescent current standby mode, the switching regulator circuit comprising:
   an output circuit coupled to an input terminal and said output terminal that generates a feedback signal indicative of the regulated voltage, said output circuit including a first switching element;
   a control circuit coupled to said output circuit that receives said feedback signal, said control circuit generating a first control signal in response to said feedback signal that controls a duty cycle of said first switching element; and
   a filter circuit responsive to a second control signal that reduces a current-drawing load on said control circuit when the regulator is operating in the standby mode.

2. The switching regulator defined in claim 1 wherein the regulator operates in the standby mode when said second control signal is generated.

3. The switching regulator defined in claim 2 wherein said second control signal is generated in response to said first control signal when said first control signal indicates that a current supplied to the output terminal falls below a fraction of the maximum rated output current of the regulator.

4. The switching regulator defined in claim 3 wherein said control circuit further comprises an error amplifier circuit that can be selectively placed in a micropower operating mode.

5. The switching regulator defined in claim 4 wherein said error amplifier circuit is placed in said micropower operating mode when said second control signal is generated in order to reduce quiescent current in the regulator.

6. The switching regulator defined in claim 2 wherein said control circuit further comprises a comparator circuit having hysteresis, said comparator circuit generating said second control signal when said first control signal falls below a threshold level.

7. The switching regulator defined in claim 3 wherein said filter circuit further comprises a second switching element.

8. The switching regulator defined in claim 7 wherein said second switching element comprises at least one transmission gate.

9. The switching regulator defined in claim 7 wherein said second switching element has at least a first and a second switch position, said second switching element being responsive to said second control signal.

10. The switching regulator defined in claim 9 wherein said filter circuit is coupled to said control circuit when said second switching element is in said first position.

11. The switching regulator defined in claim 9 wherein said current-drawing load on said control circuit is reduced when said second switching element switches from said first switch position to said second switch position.

12. The switching regulator defined in claim 11 wherein said second switching element switches from said first switch position to said second switch position when said second control signal is generated.

13. The switching regulator defined in claim 11 wherein said filter circuit is coupled to a parking voltage when said second switching element is in said second switch position so that said filter circuit is maintained charged to a value equal to that of said parking voltage.

14. The switching regulator defined in claim 13 wherein said control circuit further comprises an error amplifier circuit that can be selectively placed in a micropower operating mode, said error amplifier being responsive to said second control signal and being placed in said micropower operating mode when said second switching element switches to said second switch position so that the quiescent current of the regulator is reduced.

15. The switching regulator defined in claim 13 wherein said parking voltage is larger than a threshold voltage so that when said second switching element switches from said second switch position to said first switch position said filter circuit does not cause the regulator to change from the normal operating mode back to said standby mode.

16. A switching regulator circuit that provides a regulated voltage to a load, said switching regulator circuit comprising:

an output circuit coupled to an input terminal and to an output terminal that provides a feedback signal indicative of the regulated voltage, said output circuit including a first switching element;

a control circuit coupled to said output circuit that receives said feedback signal, said control circuit providing a control signal to said output circuit that controls a duty cycle of said first switching element in response to said feedback signal; and a filter circuit coupled to said control circuit that includes a second switching element that connects and disconnects said filter circuit from said control circuit.

17. The switching regulator defined in claim 16 wherein said control circuit comprises:

an error amplifier circuit having an output coupled to said filter circuit, a first input coupled to said feedback signal, and a second input connected to a reference voltage; and a first comparator circuit having an output, a first input and a second input, said first input coupled to said output of said error amplifier and said second input terminal coupled to a threshold voltage.

18. The switching regulator defined in claim 17 wherein said second switching element is controlled by said first comparator.

19. The switching regulator defined in claim 17 wherein said error amplifier circuit has a micropower enable input, said regulator further comprising a connection between said output of said first comparator circuit and said micropower enable input of said error amplifier circuit such that said error amplifier circuit is placed in a micropower operating mode when directed to do so by said first comparator circuit.

20. The switching regulator defined in claim 17 wherein said second switching element disconnects said filter circuit from said control circuit and connects said filter circuit to a parking voltage when said error amplifier circuit is in a micropower operating mode.

21. The switching regulator defined in claim 17 wherein said control circuit further comprises:

a switch timing circuit having an input and an output;

a second comparator circuit having a first input, a second input, and an output, said first input coupled to said output of said error amplifier circuit and said second input coupled to said output circuit;

a logic circuit having a first input coupled to said output of said second comparator circuit, a second input coupled to said output of said switch timing circuit, and an output coupled to said output circuit.

22. The switching regulator defined in claim 21 wherein said second input terminal of said second comparator circuit is coupled to receive a signal representative of a current flowing in an inductor in said output circuit.

23. The switching regulator defined in claim 21 wherein said input of said switch timing circuit is a shutdown enable input, said regulator further comprising a connection between said output of said first comparator circuit and said switch timing circuit such that said switch timing circuit shuts down when directed to do so by said first comparator circuit.

24. The switching regulator defined in claim 21 wherein said second comparator circuit has a shutdown enable input, said voltage regulator further comprising a connection between said output of said first comparator circuit and said shutdown enable input such that said second comparator shuts down when directed to do so by said first comparator circuit.

25. The switching regulator defined in claim 22 wherein said switch timing circuit includes an oscillator circuit that establishes a frequency at which said first switching element in said output circuit switches.

26. The switching regulator defined in claim 16 wherein said output circuit comprises:

an inductor coupled to said first switching element;

a diode coupled to said first switching element and said inductor; and an output capacitor coupled between said output terminal and a ground.

27. The switching regulator defined in claim 16 wherein said second switching element disconnects said filter circuit from said control circuit and connects said filter circuit to a parking voltage when the regulator is changing from a normal operating mode to a standby mode.

28. The switching regulator defined in claim 27 wherein said second switching element disconnects said filter circuit from said parking voltage and connects said filter circuit to said control circuit when the regulator is changing from a standby mode to a normal operating mode.

29. The switching regulator defined in claim 28 wherein said parking voltage is greater than a threshold voltage so that the regulator does not change back to said standby mode from said normal operating mode when said second switching element connects said filter circuit from said parking voltage to said control circuit.

30. In a switching voltage regulator that provides an output current at a regulated voltage, a method for reducing quiescent current in the voltage regulator, the method comprising:

in response to a feedback signal, generating a first control signal that is indicative of the output current;

comparing said first control signal with a threshold voltage and producing a second control signal in response to said comparison when said comparison indicates that the output current is below a predetermined value; and in response to said second control signal, placing said error amplifier in the micropower operating mode so that the quiescent current drawn by the voltage regulator is reduced.

31. The method of claim 30 wherein the regulator further includes a switching element for selectively connecting and disconnecting filter circuitry from said control circuit, said method comprising disconnecting said filter circuitry from said control circuit in response to said second control signal.

32. The method of claim 30 wherein said control circuit includes a current comparator, said method further comprising shutting down said current comparator in response to said second control signal.

33. The method of claim 30 wherein said control circuit includes a switch timing circuit, said method further comprising shutting down said switch timing circuit in response to said second control signal.

34. The method of claim 31 wherein the voltage regulator further includes a parking voltage, said method further comprising connecting said filter circuitry to said parking voltage in response to said second control signal so that said filter circuitry is maintained at a voltage substantially equal to said parking voltage.

35. The method of claim 34 wherein said parking voltage is greater than said threshold voltage, said method comprising disconnecting said filter circuitry from said parking voltage and reconnecting said filter circuitry to said control circuit when said first control signal becomes greater than said threshold voltage.

* * * * *

UNITED STATES PATENT AND TRADEMARK OFFICE
CERTIFICATE OF CORRECTION

PATENT NO.     : 6,127,815
DATED          : October 3, 2000
INVENTOR(S)    : Milton E. Wilcox Page 1 of 1

It is certified that error appears in the above-identified patent and that said Letters Patent is hereby corrected as shown below:

Please substitute claim 1 with new claim 1:

1. A switching regulator circuit that: (1) provides a regulated voltage to an output terminal and (2) is capable of operating in a low quiescent current standby mode, the switching regulator circuit comprising:

an output circuit coupled to an input terminal and said output terminal that generates a feedback signal indicative of the regulated voltage, said output circuit including a first switching element;

a control circuit coupled to said output circuit that receives said feedback signal, said control circuit generating a first control signal in response to said feedback signal that controls a duty cycle of said first switching element; and a filter circuit responsive to a second control signal that reduces a current-drawing load on said control circuit when the regulator is operating in the standby mode.

Signed and Sealed this

Twenty-fifth Day of September, 2001

*Attest:*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO. : 6,127,815
DATED : October 3, 2000
INVENTOR(S) : Milton E. Wilcox

It is certified that error appears in the above-identified patent and that said Letters Patent is hereby corrected as shown below:

Please substitute claim 30 with new claim 30:

30. In a switching voltage regulator of the type having a control circuit that includes an error amplifier that can be placed in a micropower operating mode and provides an output current at a regulated voltage, a method for reducing quiescent current in the voltage regulator, the method comprising:

in response to a feedback signal, generating a first control signal that is indicative of the output current;

comparing said first control signal with a threshold voltage and producing a second control signal in response to said comparison if said first control signal is less than or equal to said threshold voltage, and in response to said second control signal, placing said error amplifier in the micropower operating mode so that the quiescent current drawn by the voltage regulator is reduced.

Signed and Sealed this

Sixth Day of November, 2001

*Attest:*

*Attesting Officer*

NICHOLAS P. GODICI
*Acting Director of the United States Patent and Trademark Office*